United States Patent
Specht et al.

[11] Patent Number: 5,816,613
[45] Date of Patent: Oct. 6, 1998

[54] KNEE RESTRAINING DEVICE FOR VEHICLES

[75] Inventors: Martin Specht, Feldafing; Rainer Schröter, Reichertshausen, both of Germany

[73] Assignee: TRW Occupant Restraint Systems GmbH, Alfdorf, Germany

[21] Appl. No.: 887,816

[22] Filed: Jul. 3, 1997

[30] Foreign Application Priority Data

Jul. 8, 1996 [DE] Germany ............ 296 11 869 U

[51] Int. Cl.⁶ .................................. B60R 21/04
[52] U.S. Cl. ............... 280/753; 280/752; 280/730.1
[58] Field of Search .................. 280/753, 752, 280/730.1, 732, 751, 728.1

[56] References Cited

U.S. PATENT DOCUMENTS 3,966,227  6/1976  Cameron ........................ 280/752
5,536,043  7/1996  Lang et al. .................. 280/730.1 X
5,630,621  5/1997  Schneider ........................ 280/753

FOREIGN PATENT DOCUMENTS 6032195  2/1994  Japan ........................ 280/753

*Primary Examiner*—Christopher P. Ellis
*Attorney, Agent, or Firm*—Tarolli, Sundheim, Covell, Tummino & Szabo

[57] ABSTRACT

The present invention provides a knee restraining device for vehicles which comprises a knee protector plate adapted to be moved toward the knees of a vehicle occupant. The knee restraining device comprises a base plate adapted to be mounted against the outline of the bottom part of a dashboard. The base plate has at least one opening for connection with a gas source arranged in the dashboard. Furthermore, the knee restraining device has a wall, of flexible material, folded up between the base plate and the knee restraining plate in the inactive position thereof. This wall is connected along a first closed rim with the base plate and along a second closed rim with the knee restraining plate.

11 Claims, 3 Drawing Sheets

KNEE RESTRAINING DEVICE FOR VEHICLES

TECHNICAL FIELD OF THE INVENTION

The invention relates to a knee restraining device for vehicles comprising a knee protector plate adapted to be moved toward the knees of a vehicle occupant.

BACKGROUND OF THE INVENTION

The restraining action, which can be produced by an inflatable gas bag in a vehicle in a crash, is insufficient, if the body of the vehicle occupant is not additionally restrained by a properly fastened safety belt or by a knee cushion. Since knee cushions, that are rigidly installed in the vehicle, limit freedom of movement, movable knee cushions have been developed, which in a head-on crash involving the vehicle are shifted out toward the knees of the occupant. A knee restraining device of this type is for example described in the German patent publication 39 08 713 A1. In the case of a further knee restraining device described in the European patent publication 0 684 164 A1 a knee protector plate, which is releaseably mounted in the bottom part of the dashboard and which is connected via flexible wall part to a bracket arranged rigidly inside the dashboard is thrust against the knees of the vehicle occupant by means of gases under pressure coming from a gas generator and introduced into the chamber surrounded by the flexible wall.

It has been found that such knee restraining devices are integrated in the structure of the dashboard and can not be provided as an option.

SUMMARY OF THE INVENTION

The invention provides a knee restraining device for vehicles which if required may be fitted to already existing designs of dashboards. By means of such a knee restraining device vehicles which are designed for countries in which the wearing of safety belts is mandatory and therefore do not require any knee restraining device, may be adapted for use in countries in which wearing safety belts is not mandatory, by fitting a maximum-efficiency knee restraining device. The knee restraining device according to the present invention comprises a base plate adapted to be mounted against the outline of the bottom part of a dashboard. The base wall has at least one opening for connection with a gas source arranged in the dashboard. Furthermore, the knee restraining device has a wall, of flexible material, folded up between the base plate and the knee restraining plate in the inactive position. This wall is connected along a first closed rim with the base plate and along a second closed rim with the knee restraining plate. The base plate snugly fits against the bottom part of the pre-existing dashboard and may, if required, be mounted thereon. In the inactive state the base plate, the knee restraining plate and the wall, folded up between them, of flexible material have a small overall height so that the freedom of movement in the knee well is hardly reduced at all.

In the case of the preferred embodiment the wall of flexible material is constituted by a gas bag, whose inflation opening is connected through the opening in the base plate with the gas source. For the design of the knee restraining device it is consequently possible to use established gas bag technology. The connection of the gas bag with the base plate on the one hand and with the knee restraining plate on the other hand is a simple matter, because large attachment areas are available on which the high load occurring can be effectively distributed.

Further features and advantages of the invention will appear from the following account of a plurality of embodiments and from the drawing, to which reference is had.

DETAILED DESCRIPTION OF THE FIGURES

Figure 1:
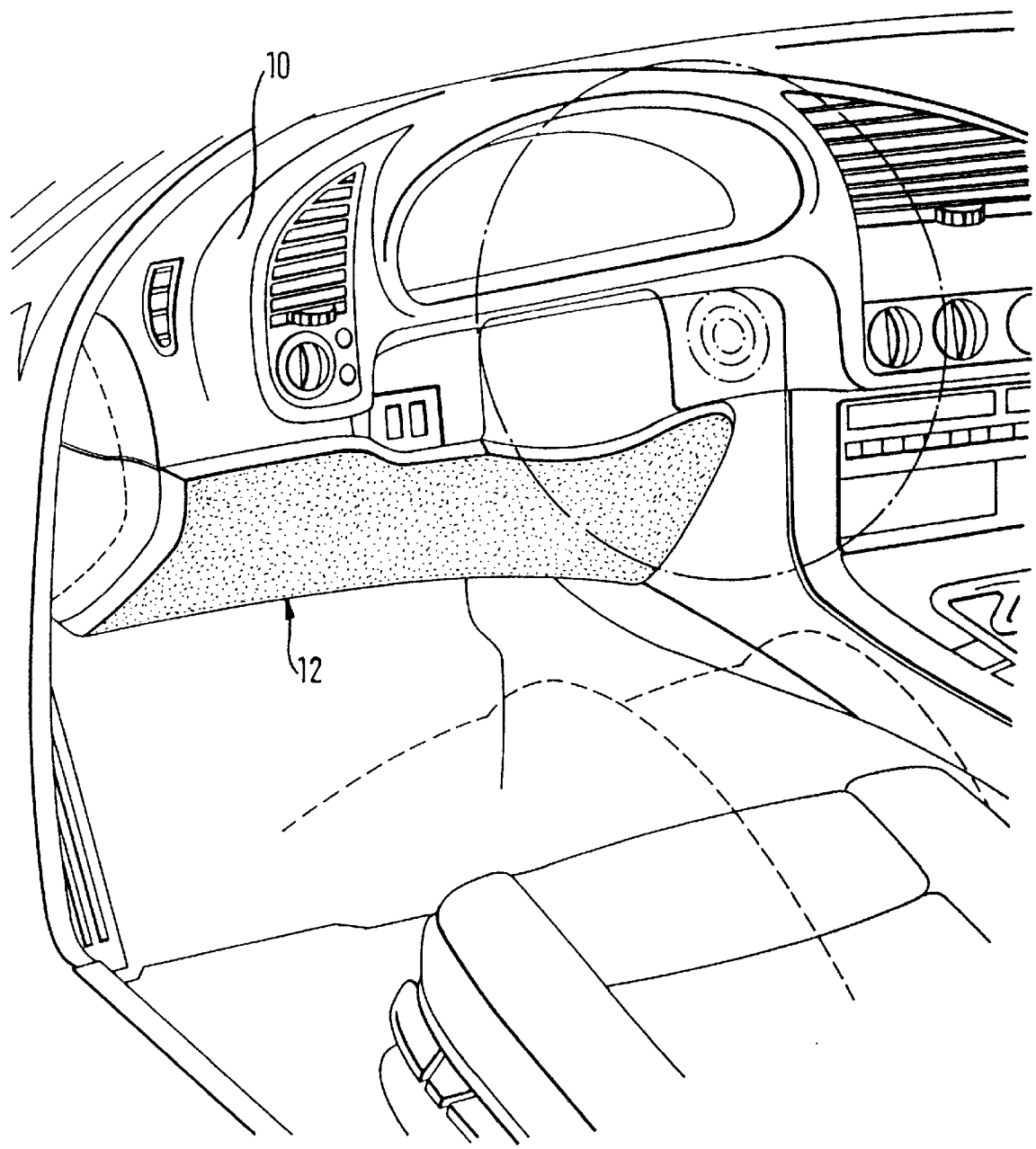
FIG. 1 is a perspective view of the front interior space of a vehicle with a knee restraining device, mounted on the bottom part of the dashboard in the inactive state.

In FIG. 1 the reader will see a dashboard 10 situated in the front interior space of a vehicle and on whose bottom part the knee restraining device 12 designed in accordance with the invention is mounted. The figure clearly shows how such knee restraining device 12 matches the outline or border of the dashboard. Generally speaking it is shallow so that the knee space for the vehicle occupant is hardly reduced at all.

Figure 2:
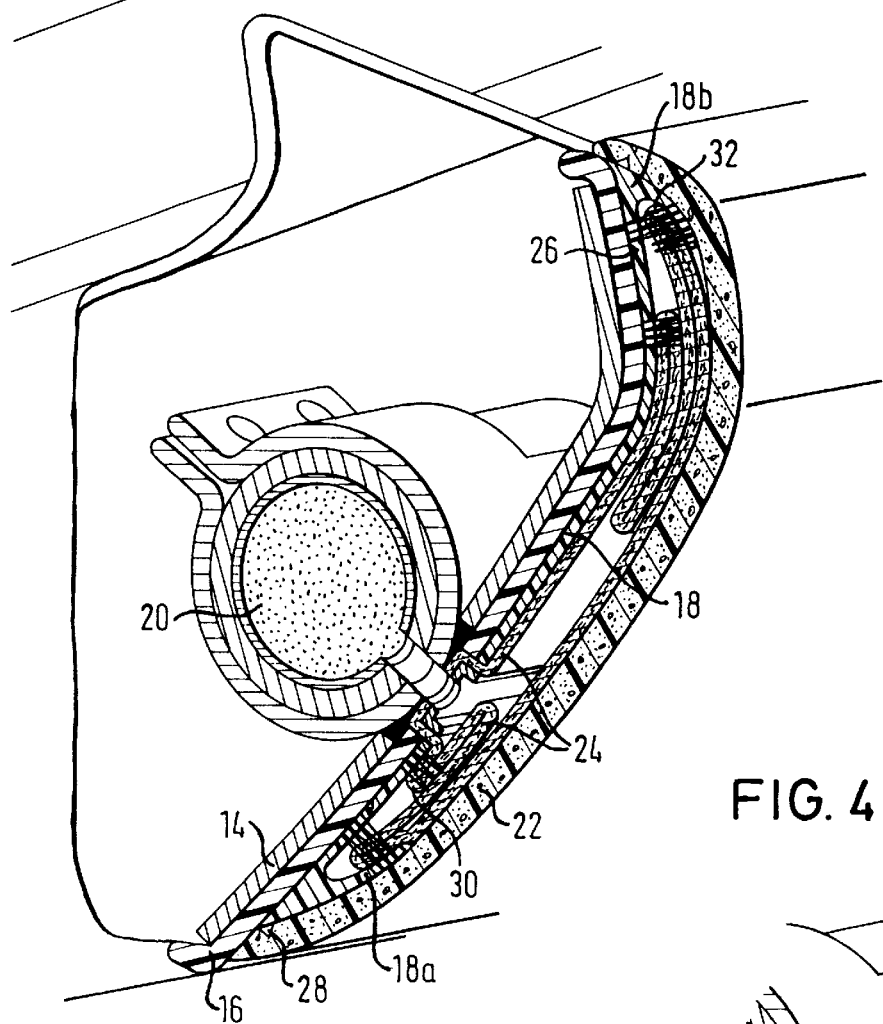
FIG. 2 is a perspective sectional view of the bottom part of the dashboard together with the knee restraining device.

FIG. 2 shows the structure of the knee restraining device. On its inner side the dashboard 10 is reinforced by a sheet metal reinforcing element 14, on which a panel 16 of foam plastic is mounted. On this panel 16 a base plate 18 in the form of extruded section of plastic is snugly fitted. The sheet metal reinforcing element 14, the panel 16 and the base plate 18 are provided with superposed openings for connection with a gas source 20, arranged in the interior of the dashboard 10, in the form of a pyrotechnic gas generator. The base plate 18 is provided with an external peripheral rim 18b, having a marginal strip 18a bent forward at an acute angle. On this marginal strip 18a a knee protector plate 22 of foam plastic is mounted. Between this knee protector plate 22 and the base plate 18 a gas bag 24 is arranged in a folded condition. This gas bag 24 is provided with an inflation opening surrounded by wall parts which extend through the openings in the base plate 18, the panel 16 and the sheet metal reinforcing element 14 as far as a connection point of the gas source 20.

Along its outer periphery of its opening the base plate 18 is provided with a predetermined break line 26. Along this break line 26 its peripheral rim 18b with the marginal strip 18a may be broken off from the remaining part of the base plate 18. The knee protector plate 22, in turn, is provided with a predefined break line 28 along its outer periphery, along which it may be broken off from the panel 16 while still remaining connected with the torn off marginal strip 18a of the base plate 18.

The gas bag 24 constitutes a flexible wall which together with the base plate 18 and the knee protector plate 22 delimits a chamber adapted to expand on flow of gas under pressure from the gas source 20. Along a first closed rim 30, which is formed by two superposed and folded plies of the gas bag 24, the latter is secured by means of a multiple seam on the base plate 18. This first rim 30 is encompassed by a second rim 32 of the gas bag 24, which is also constituted by two plies of the gas bag folded on top of one another, the plies being connected by a multiple seam with the peripheral rim 18b, able to be torn off, and the marginal strip 18a of the base plate 18. The front wall part, on the inner side of the second rim 32 of the gas bag 24, only bears against the inner side of the knee protector plate 22.

Figure 3:
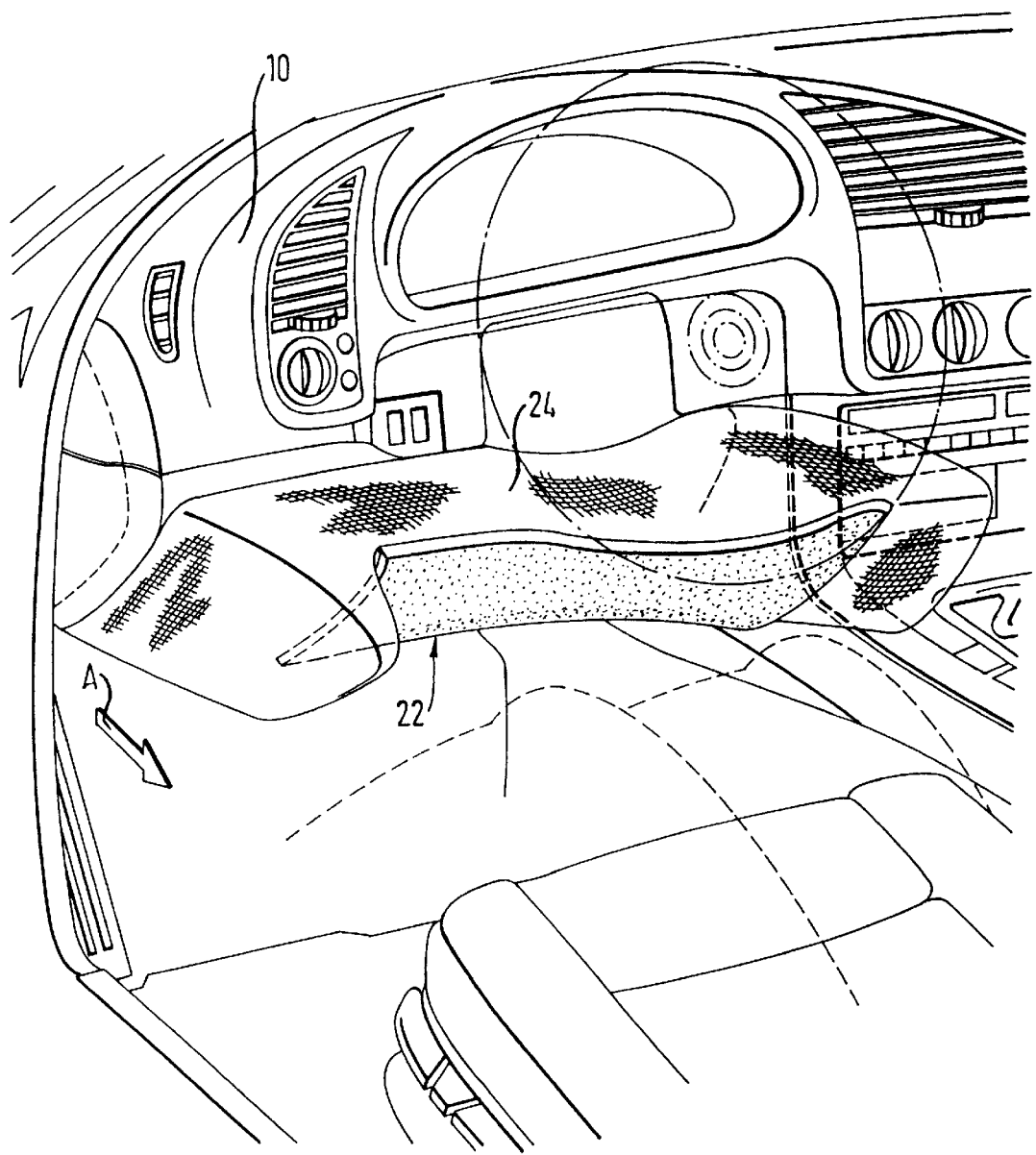
FIG. 3 is a perspective elevation like FIG. 1 but after activation of the restraining device.

On activation of the gas source 20 the chamber formed between the flexible wall of the gas bag 24, the knee protector plate 22 and the base plate 18 is subjected to gas under pressure. The expansively acting pressure force so produced means that the knee protector plate 22 is detached along the break line 28 from the panel 16 and the peripheral rim 18*b* of the base plate 18 is detached together with the marginal strip 18*a* along the break line 26 from the remaining part of the base plate 18. The knee protector plate 22 is now only held by the flexible wall of the gas bag 24. It becomes detached from the dashboard 10 and moves toward the knees of the occupant until the flexible wall of the gas bag 24 is stretched out between its anchored rims 30 and 32. This stage is indicated in FIG. 3. The knee protector plate 22 will have moved in the direction of the arrow A as far as near the knees of the vehicle occupant; the flexible wall of the gas bag 24 is completely unfolded so that the knee protector plate 22 is stabilized in its position.

During the following forward movement of the vehicle occupant his knees will strike against the knee protector plate 22. The plate 22 is supported by the gas cushion present in the interior of the gas bag 24 over a larger area, the supporting forces being distributed over the knee protector plate 22 athwart the direction of action. The distribution of the supporting forces athwart their direction of action over a large part of the knee protector plate 22 is highly significant, since excessive local denting of the knee protector plate 22 is prevented, and such denting would be a fixed support point for the thighs of the occupant. Such a fixed support point acts like a ball and socket joint and leads to high axial strains on the femurs.

Figure 4:
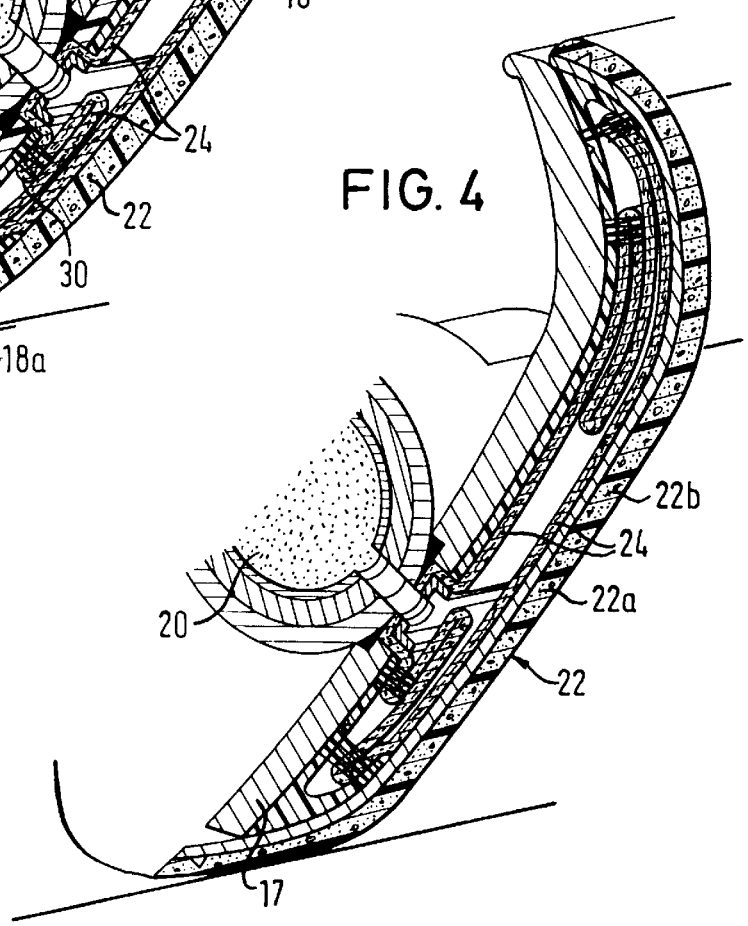
FIG. 4 is a sectional view of a further embodiment of the knee restraining device.

The design illustrated in FIG. 4 differs from that described previously essentially only as regards the structure of the knee protector plate 22 itself. Such plate comprises an internal load distributing plate 22*a* and a plastic casing of foam material 22*b*. Furthermore the sheet metal reinforcing element 14 and the panel 16 are replaced by a one-piece support wall 17 on the bottom side of the dashboard. The structure and function of the gas bag 24 and of the base plate 18 as well are the same as in the case of the above described embodiment and are therefore not described again.

In all embodiments the wall of the gas bag 24 can be secured to the base plate 18 or, respectively, on the knee protector plate 22 by other means besides seams, as for example by rivets or a clamping connection means.

What is claimed:

1. A knee restraining device for vehicles comprising a knee protector plate adapted to be moved toward the knees of a vehicle occupant, wherein said knee restraining device comprises a base plate adapted to be mounted against the outline of the bottom part of a dashboard, said base plate having at least one opening for connection with a gas source arranged in the dashboard, and said knee restraining device further comprises a wall, of flexible material, folded up between the base plate and the knee restraining plate in an inactive position thereof, said wall being connected along a first closed rim with said base plate and along a second closed rim with said knee restraining plate.

2. The knee restraining device according to claim 1, wherein said wall made of said flexible material is formed by a gas bag, whose inflation opening is connected with said gas source through said opening in the base plate.

3. The knee restraining device according to claim 1, wherein said wall made of flexible material is connected along its first rim with a detachable external peripheral rim, connected with said knee restraining plate, of said base plate.

4. The knee restraining device according to claim 3, wherein the peripheral edge of said base plate has a bent around marginal strip bent at an acute angle to said knee restraining plate.

5. The knee restraining device according to claim 1, wherein said base plate is made of an extruded section.

6. The knee restraining device according to claim 5, wherein said base plate is made of plastic material.

7. The knee restraining device according to claim 1, wherein said knee restraining plate is connected along a break line with said dashboard.

8. The knee restraining device according to claim 1, wherein said dashboard is reinforced underneath said base plate by a sheet metal reinforcing element placed therein.

9. The knee restraining device according to claim 8, wherein a panel made of foam plastic is inserted between said sheet metal reinforcing element and said base plate.

10. The knee restraining device according to claim 1, wherein said knee restraining plate is manufactured of plastic foam material.

11. The knee restraining device according to claim 1, wherein said knee restraining plate includes a load distributing plate and a plastic casing of foam material.

\* \* \* \* \*